(12) United States Patent
Wang (10) Patent No.: US 11,179,766 B2
(45) Date of Patent: Nov. 23, 2021

(54) PULL RIVETING SYSTEM

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Weiyi Wang, Hangzhou (CN)

(73) Assignees: HANGZHOU GREAT STAR INDUSTRIAL CO., LTD., Hangzhou (CN); HANGZHOU GREAT STAR TOOLS CO., LTD., Hangzhou (CN)

( * ) Notice: Subject to any disclaimer, the term of this patent is extended or adjusted under 35 U.S.C. 154(b) by 446 days.

(21) Appl. No.: 16/345,294

(22) PCT Filed: Nov. 2, 2017

(86) PCT No.: PCT/CN2017/109173
§ 371 (c)(1),
(2) Date: Apr. 26, 2019

(87) PCT Pub. No.: WO2019/084884
PCT Pub. Date: May 9, 2019

(65) Prior Publication Data
US 2021/0331230 A1    Oct. 28, 2021

(51) Int. Cl.
    *B21J 15/10*    (2006.01)
(52) U.S. Cl.
    CPC .................. *B21J 15/105* (2013.01)
(58) Field of Classification Search
    CPC ............ B21J 15/105; B21J 15/38; B25H 7/00
    See application file for complete search history.

(56) References Cited

U.S. PATENT DOCUMENTS

| | | | | |
|---|---|---|---|---|
| 2,605,011 A | * | 7/1952 | Volpe ..................... | B21J 15/043 |
| | | | | 72/406 |
| 3,328,985 A | * | 7/1967 | Keymer ................. | B21J 15/386 |
| | | | | 29/243.528 |

(Continued)

FOREIGN PATENT DOCUMENTS

| | | |
|---|---|---|
| CN | 2208996 Y | 10/1995 |
| CN | 103658493 A | 3/2014 |

(Continued)

OTHER PUBLICATIONS

International Search Report for International Application No. PCT/CN2017/109173 dated Jul. 27, 2018.

*Primary Examiner* — Bayan Salone
(74) *Attorney, Agent, or Firm* — Andrus Intellectual Property Law, LLP (57) ABSTRACT

The present invention provides a pull riveting system including two or more pull-rivets and a riveting device, the pull-rivet including a rivet mandrel; the riveting device including two or more rivet gun heads, each provided with a rivet gun hole; wherein each of the pull-rivets is provided with a first label; each rivet gun head is provided with a second label; when one pull-rivet is matched with one rivet gun head, the rivet mandrel of this pull-rivet is applicable to the rivet gun hole of the rivet gun head, and the first label of the pull-rivet is the same as or corresponds to the second label of the rivet gun head. The present invention has the advantageous effects that labels easily identified with naked eyes are arranged on the rivet gun head and the pull-rivet, such that the pull-rivet and the rivet gun head which are matched with each other form a simple correspondence, so that the user may rapidly identify the pull-rivet specification and the rivet gun head matched with the pull-rivet, effectively reducing the waste of the pull-rivets, lowering the (Continued)

damage risk to the rivet gun, and effectively improving the work efficiency.

18 Claims, 4 Drawing Sheets

(56) References Cited

U.S. PATENT DOCUMENTS

| | | | | |
|---|---|---|---|---|
| 3,334,509 A | * | 8/1967 | Elliott | B21J 15/043 29/243.528 |
| 3,646,800 A | * | 3/1972 | Martin | B21J 15/043 29/243.528 |
| 3,842,649 A | * | 10/1974 | Di Maio | B21J 15/043 29/243.528 |
| 3,886,782 A | * | 6/1975 | Miyamoto | B21J 15/043 29/243.528 |
| 4,347,729 A | * | 9/1982 | Mitani | B21J 15/043 29/243.528 |
| 4,353,239 A | * | 10/1982 | Fujimoto | B21J 15/043 29/243.528 |
| 4,807,460 A | * | 2/1989 | Tzong | B21J 15/043 29/243.528 |
| 5,361,474 A | | 11/1994 | Yang | |
| 8,650,731 B2 | * | 2/2014 | Ko | B21J 15/043 29/243.521 |
| 2001/0054221 A1 | * | 12/2001 | Ohuchi | B21J 15/105 29/243.521 |
| 2011/0209341 A1 | * | 9/2011 | Ko | B21J 15/043 29/720 |

FOREIGN PATENT DOCUMENTS

| | | | | |
|---|---|---|---|---|
| CN | 104875175 | * | 9/2015 | B21J 15/38 |
| CN | 104875175 A | | 9/2015 | |
| TW | M385417 U1 | | 8/2010 | |

* cited by examiner

Fig. 6

PULL RIVETING SYSTEM

CROSS-REFERENCE TO RELATED APPLICATIONS

This application is the U.S. national stage application of International Application PCT/CN2017/109173, filed Nov. 2, 2017.

FIELD OF THE INVENTION

The present invention relates to a riveting process, and in particular, to a pull riveting system.

DESCRIPTION OF THE PRIOR ART

As a common riveting fastener, a pull-rivet is also referred to as a self-plugging rivet or a huck bolt. Usually, the pull-rivet includes a rivet portion, a rivet head and a rivet mandrel. Also known as a rivet tool or a rivet gun, a riveting device refers to mechanical equipment for riveting objects together through pull-rivets, including an electric riveting device, a pneumatic riveting device, a hand riveting device, or the like. The riveting device has such operating principle that a rivet gun hole (rivet-pulling through hole) is arranged at a front end of the riveting device, the rivet mandrel of the pull-rivet may be inserted into this through hole, the rivet portion is inserted into riveting holes of two objects to be riveted; the rivet mandrel is dragged backwards by a member inside the riveting device, so that the rivet portion at the front end of the pull-rivet expands and is deformed, which causes a permanent fastening force, thereby fixing the two objects to be riveted together.

In engineering applications, the objects to be riveted have different materials and sizes, and their riveting holes have different inner diameters. Therefore, the available pull-rivets have different specifications which are usually differentiated in terms of a diameter of the rivet mandrel. A common pull-rivet is relatively thin, and its rivet mandrel generally has a diameter between 1 mm and 5 mm. For the pull-rivets of different specifications, diameters of their rivet mandrels have a relatively small difference value usually less than or equal to 1 mm, even up to about 0.2 mm. In this way, once the pull-rivets of different specifications are mixed up, it is difficult for construction personnel to identify a detailed specification of each pull-rivet with naked eyes.

In order to be adapted to multiple specifications of pull-rivets, the riveting device is provided with a plurality of detachable rivet gun heads, each of which is provided with a rivet gun hole (rivet-pulling through hole) insertable into pull-rivets of different specifications. Similarly, the rivet gun hole has a relatively small inner diameter, only slightly larger than the rivet mandrel of the pull-rivet corresponding to the rivet-pulling through hole, usually between 1 mm and 5 mm. The inner diameters of different rivet gun holes also have a relatively small difference value, usually less than or equal to 1 mm, or may be up to about 0.2 mm. In this way, it is difficult for the construction personnel to find out a rivet gun head corresponding to a certain pull-rivet at work.

In the process of construction, each rivet gun head can only correspond to the pull-rivet of one specification. Therefore, before each pull riveting operation, the construction personnel need to select appropriate pull-rivets according to the size of the riveting hole of the object to be riveted, and to find out the rivet gun head matching with this rivet. Due to a very small difference between diameters of rivet mandrels of a plurality of pull-rivets and a very small difference between inner diameters of rivet gun holes of a plurality of rivet gun heads, it is difficult to rapidly identify the correspondence between the pull-rivet and the rivet gun head, and sometimes an accurate measurement is required, so that the whole construction process wastes time and energy, and the work efficiency is relatively low. Once the selected pull-rivet is not matched with the rivet gun head, the pull-rivet will get stuck, which cannot implement riveting, but also damages the riveting device and the rivet, thus wasting pull-rivets.

Persons skilled in the art are directed to a new pull riveting process which may simply correspond the pull-rivet to the rivet gun head matching with the rivet, and which may be convenient for a user to rapidly select the required pull-rivet and rivet gun head.

SUMMARY OF THE INVENTION

An object of the present invention is to provide a pull riveting system for solving the technical problems existing in the prior pull riveting process of difficult identification of the pull-rivet specification as well as the matching relation of the pull-rivet with the rivet gun head.

In order to solve the above-mentioned technical problems, the present invention provides a pull riveting system, including two or more pull-rivets and a riveting device, the pull-rivet including a rivet mandrel; the riveting device including two or more rivet gun heads, each provided with a rivet gun hole; in which each of the pull-rivets is provided with a first label; each rivet gun head is provided with a second label; when one pull-rivet is matched with one rivet gun head, the rivet mandrel of this pull-rivet is applicable to the rivet gun hole of the rivet gun head, and the first label of the pull-rivet is the same as or corresponds to the second label of the rivet gun head.

Further, in different embodiments, the pull-rivet is divided into at least two groups according to the size specification of its rivet mandrel; the diameters of the rivet mandrels of two or more pull-rivets in the same group have the same size specifications; two or more pull-rivets in the same group have the same first label; two or more pull-rivets in the same group are matched with the same rivet gun head.

Further, in different embodiments, the first label of the pull-rivet is used for identifying a category of the pull-rivet; the second label of the rivet gun head is used for identifying the category of the pull-rivet matching with this rivet gun head.

Further, in different embodiments, the first label is a color label, the categories of two or more groups of pull-rivets are distinguished using two or more colors, each color corresponds to one pull-rivet category; the second label is a color label, the categories of two or more groups of pull-rivets are distinguished using two or more colors, each color corresponds to one pull-rivet category matching with one rivet gun head; when one pull-rivet is matched with one rivet gun head, the color of the first label of the pull-rivet is the same as or corresponds to that of the second label of the rivet gun head.

Further, in different embodiments, the first label has the color of a pull-rivet coating which is partially or entirely coated on the surface of the pull-rivet; the second label has the color of a rivet gun head coating which is partially or entirely coated on the surface of the rivet gun head.

Further, in different embodiments, the first label is a shape label, the categories of two or more groups of pull-rivets are distinguished using two or more shapes, each shape corresponds to one pull-rivet category; the second label is a shape label, the categories of two or more groups of pull-rivets are distinguished using two or more shapes, each shape corresponds to one pull-rivet category matching with one rivet gun head; when one pull-rivet is matched with one rivet gun head, the shape of the first label of the pull-rivet is the same as or corresponds to that of the second label of the rivet gun head.

Further, in different embodiments, the first label has a shape of a first pattern, the first pattern is arranged on the surface of the pull-rivet; the second label has a shape of a base, the base is a part of the rivet gun head; or, the second label has a shape of a bump or a groove, the bump or the groove is arranged on the surface of one rivet gun head; or, the second label has a shape of a second pattern, the second pattern is arranged on the surface of the rivet gun head; when one pull-rivet is matched with one rivet gun head, the base or the bump or the groove has a shape the same as or corresponding to the shape of the pattern.

Further, in different embodiments, the first label and the second label are both character labels; the character label includes a number label or a letter label.

Further, in different embodiments, the pull riveting system further includes a receiving box for receiving the pull-rivet.

In order to solve the above-mentioned technical problems, the present invention further provides a pull riveting system, including two or more pull-rivets, a riveting device and a receiving box; the pull-rivet includes a rivet mandrel; the riveting device includes two or more rivet gun heads provided with rivet gun holes; the receiving box includes two or more receiving spaces, each of which is used for receiving the pull-rivet; in which each rivet gun head is provided with a second label; each pull-rivet is provided with a first label, and/or, each receiving space is provided with a third label; when one pull-rivet is matched with one rivet gun head, the rivet mandrel of the pull-rivet is applicable to the rivet gun hole of the rivet gun head, the first label of the pull-rivet, and/or, the third label of the receiving space where the pull-rivet is located is the same as or corresponds to the second label of the rivet gun head.

Further, in different embodiments, the pull-rivet is divided into at least two groups according to the size specification of the diameter of its rivet mandrel; the diameters of the rivet mandrels of two or more pull-rivets in the same group have the same size specifications; two or more pull-rivets in the same group have the same first label; two or more pull-rivets in the same group are matched with the same rivet gun head; two or more pull-rivets in the same group are arranged in the same receiving space.

Further, in different embodiments, the first label of the pull-rivet is used for identifying a category of the pull-rivet; the second label of the rivet gun head is used for identifying the category of the pull-rivet matching with this rivet gun head; the third label of the receiving space is used for identifying the category of the pull-rivet in the receiving space.

Further, in different embodiments, the second label is a color label, the categories of two or more groups of pull-rivets are distinguished using two or more colors, each color represents one pull-rivet category matching with one rivet gun head; the first label is a color label, the categories of two or more groups of pull-rivets are distinguished using two or more colors, each color represents one pull-rivet category; and/or, the third label is a color label, the categories of two or more groups of pull-rivets are distinguished using two or more colors, each color represents the category of the pull-rivet in one receiving space; when one pull-rivet is matched with one rivet gun head, the color of the first label of the pull-rivet and/or the color of the third label of the receiving space is the same as or corresponds to that of the second label of the rivet gun head.

Further, in different embodiments, the second label has the color of a rivet gun head coating which is partially or entirely coated on the surface of the rivet gun head; the first label has the color of a pull-rivet coating which is partially or entirely coated on the surface of the pull-rivet; and/or, the third label has the color of a space wall which includes a side wall or a bottom surface or a top surface of the receiving space.

Further, in different embodiments, the space wall is made of a colorful material; or, an inner side or an outer side of the space wall is partially or entirely attached with a colorful tag; or, the inner side or the outer side of the space wall is partially or entirely coated with a colorful dye.

Further, in different embodiments, the second label is a shape label, the categories of two or more groups of pull-rivets are distinguished using two or more shapes, each shape corresponds to one pull-rivet category matching with one rivet gun head; the first label is a shape label, the categories of two or more groups of pull-rivets are distinguished using two or more shapes, each shape corresponds to one pull-rivet category; and/or, the third label is a shape label, the categories of two or more groups of pull-rivets are distinguished using two or more shapes, each shape corresponds to the category of the pull-rivet located in one receiving space; when one pull-rivet is matched with one rivet gun head, the shape of the first label of the pull-rivet and/or the shape of the third label of the receiving space is the same as or corresponds to that of the second label of the rivet gun head.

Further, in different embodiments, the second label has a shape of a base, the base is a part of the rivet gun head; or, the second label has a shape of a bump or a groove, the bump or the groove is arranged on the surface of one rivet gun head; the first label has a shape of the first pattern, the first pattern is arranged on the surface of the pull-rivet; and/or, the third label has a shape of a third pattern, the third pattern is arranged on the surface of the inner side or the outer side of the space wall; when one pull-rivet is matched with one rivet gun head, the base or the bump or the groove has a shape the same as or corresponding to the shape of the first or second pattern.

Further, in different embodiments, the second label, the first label and/or the third label are all character labels or pattern labels; the character label includes a number label or a letter label.

The present invention has the advantageous effects that a new pull riveting system is provided, in which labels easily identified with naked eyes are arranged on the rivet gun head, the pull-rivet and/or the receiving box where the pull-rivets are located, such that the pull-rivet and the rivet gun head which are matched with each other form a simple correspondence, so that the user may rapidly identify the pull-rivet specification and the rivet gun head matched with the pull-rivet, effectively reducing the waste of the pull-rivets, lowering the damage risk to the rivet gun, and effectively improving the work efficiency.

REFERENCE NUMERALS IN THE DRAWINGS 1 pull-rivet, 2 riveting device, 3 receiving box;
11 rivet mandrel, 12 rivet head, 13 rivet portion;
21 rivet gun head, 22 base, 23 threaded connecting portion, 24 rivet gun hole; 31 receiving space, 32 space wall

DETAILED DESCRIPTION OF THE PREFERRED EMBODIMENTS

The preferable embodiments of the present invention will be below introduced with reference to drawings of the specification fully, such that its technical contents are clearer and easier to understand. The present invention can be embodied by different embodiments in different forms. The protection scope of the present invention is not limited to the embodiments mentioned herein.

In the drawings, structure-like members are labeled with like reference numerals, and structure or function-similar members are labeled with similar reference numerals. Directional relative terms mentioned in the present invention, such as upper, lower, front, back, left, right, inside, outside, side, top, bottom, top end, bottom end, tail end and the like, are only the directions in the drawings, and are only used for explaining and describing the present invention, instead of limiting the protection scope of the present invention.

When some members are referred to as being "on" another member, they can be directly on the other member; or an intervening member may also be present, the member is placed on the intervening member and the intervening member is placed on the other member. When a member is referred to as being "mounted to" or "connected to" another element, it is understood as direct "mounting" or "connecting", or one member being indirectly "mounted to" or "connected to" another member by an intervening member.

First Embodiment

Figure 1:
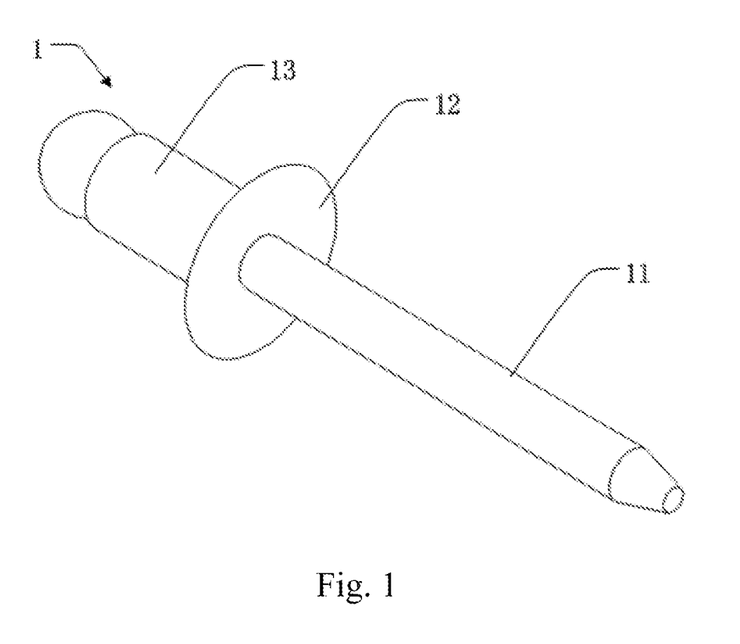
FIG. 1 is a structural schematic diagram of a pull-rivet according to an embodiment of the present invention.
Figure 2:
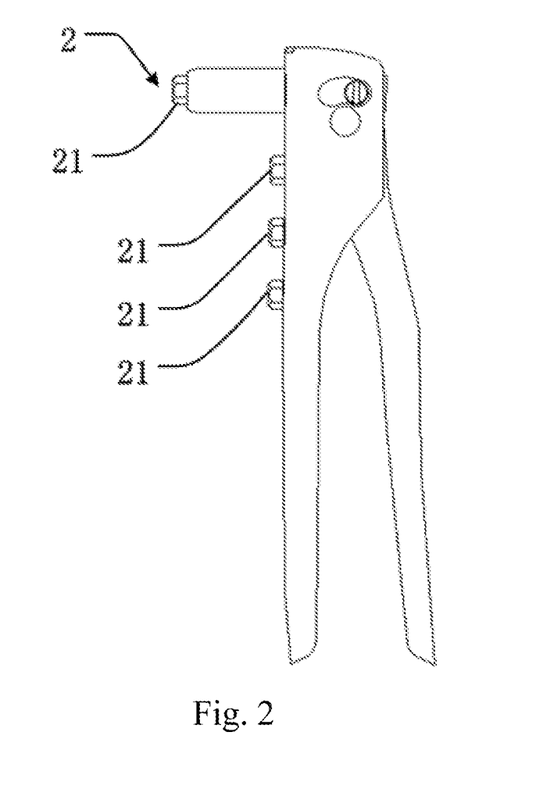
FIG. 2 is a structural schematic diagram of a riveting device according to an embodiment of the present invention.

As shown in FIGS. 1-2, the present embodiment provides a pull riveting system, including two or more pull-rivets 1 and one riveting device 2. The pull-rivet 1 successively includes a rivet mandrel 11, a rivet head 12 and a rivet portion 13; the riveting device 2 includes two or more detachable rivet gun heads 21, each of which includes a base 22 and a threaded connecting portion 23 which are integrated. Each rivet gun head 21 is provided with a rivet gun hole 24, penetrating through the base 22 and the threaded connecting portion 23. When the rivet mandrel of a certain pull-rivet 1 is applicable to the rivet gun hole 24 of one rivet gun head 21, it can be considered that this pull-rivet 1 is matched with this rivet gun head 21.

A plurality of pull-rivets 1 are divided into at least two groups according to different specifications. In the present embodiment, the specification of the pull-rivet 1 is a size specification of the diameter of the rivet mandrel 11 of the pull-rivet 1, the rivet mandrels 11 of a plurality of pull-rivets in the same group have the same diameter size, with the same size specification; a plurality of pull-rivets in the same group are matched with the same rivet gun head 21.

Each pull-rivet is provided with a first label for identifying the category of this pull-rivet. The plurality of pull-rivets in the same group have the same first label. Each rivet gun head is provided with a second label for identifying the category of the pull-rivet matched with the rivet gun head. When one pull-rivet is matched with one rivet gun head, the first label of the pull-rivet is the same as or corresponds to the second label of the rivet gun head.

In the present embodiment, the first label is a color label, the categories of two or more groups of pull-rivets are distinguished using two or more colors, each color corresponds to one pull-rivet category, and the pull-rivets of different specifications are represented by different colors. Specifically, the first label has the color of a pull-rivet coating which is partially or entirely coated on the surface of the pull-rivet, such that the user can identify the specification of the pull-rivet with naked eyes. In the pull-rivet processing, the surface treatment can be performed on the pull-rivet by a processing method of electrophoresis, silk screen, transfer printing, physical vapor deposition, paint spraying, or the like, thereby obtaining the pull-rivet with a coating. For example, there are four small pull-rivets commercially available, with the diameters of their rivet mandrels of 1.55 mm, 1.75 mm, 2.1 mm and 2.6 mm respectively. Red, yellow, blue and green pull-rivet coatings are partially or entirely coated on the surfaces of the four pull-rivets using the above-mentioned processing method. The four colors correspond to the pull-rivets of four specifications respectively. The user will know that the rivet mandrel of the pull-rivet has a diameter of 1.55 mm when catching sight of the red pull-rivet, and will know that the rivet mandrel of the pull-rivet has a diameter of 2.6 mm when catching sight of the green pull-rivet, and so on. The user may rapidly select the appropriate pull-rivet according to the size of the inner diameter of the riveting hole of the object to be riveted, based on specific requirements in the riveting construction.

Figure 3:
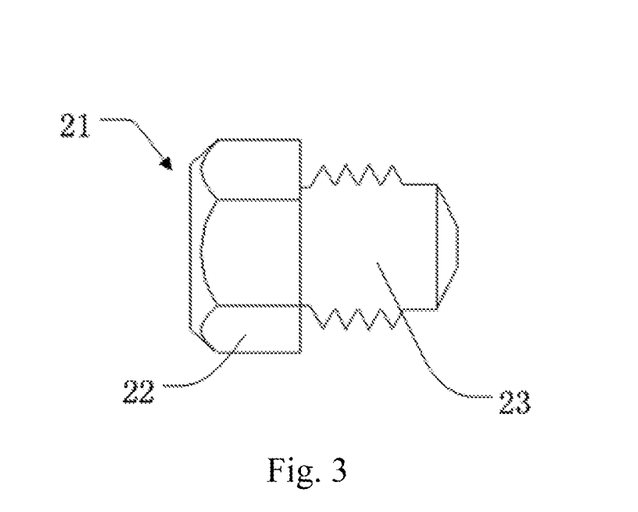
FIG. 3 is a side structural schematic diagram of a rivet gun head according to an embodiment of the present invention.
Figure 4:
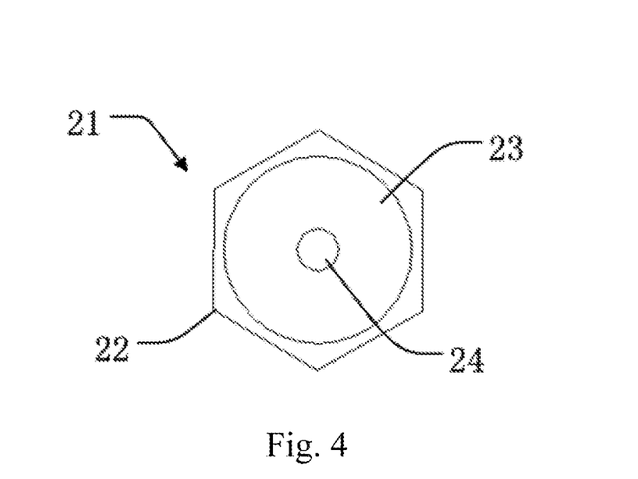
FIG. 4 is a front structural schematic diagram of a rivet gun head according to an embodiment of the present invention.

In the present embodiment, the second label is a color label, the categories of two or more groups of pull-rivets are distinguished using two or more colors, each color corresponds to one pull-rivet category matching with one rivet gun head. The color label of the rivet gun head 21 represents the pull-rivet specification suitable for the rivet gun head 21, and the user may know the pull-rivet specification suitable for the rivet gun head 21 when catching sight of the rivet gun head 21. Specifically, the second label has the color of a rivet gun head coating which is partially or entirely coated on the surface of the rivet gun head, such that the user can identify the specification of the pull-rivet suitable for the rivet gun head with naked eyes. In the rivet gun head processing, the surface treatment can be performed on the rivet gun head by a processing method of electrophoresis, silk screen, transfer printing, physical vapor deposition, paint spraying, or the like, thereby obtaining the rivet gun head with a coating. For example, usually, a singlehanded rivet gun is generally provided with four detachable rivet gun heads 21 matching with the pull-rivets 1 of four specifications respectively. The user may exchange the rivet gun head 21 by him or herself as appropriate. In the present embodiment, the surfaces of the four rivet gun heads 21, for example the side wall and/or bottom surface of the base 22, can also be provided with the rivet gun head coatings of four colors, which represent the pull-rivets 1 of four specifications matching with the rivet gun heads 21.

When one pull-rivet 1 is matched with one rivet gun head 21, the color of the first label of the pull-rivet 1 is the same as or corresponds to the color of the second label of the rivet gun head 21. Specifically, the four rivet gun heads 21 are matched with the pull-rivets 1 of the four specifications respectively, and the four rivet gun heads 21 are provided with red, yellow, blue and green labels on the surfaces respectively, the same as the color labels of the pull-rivets 1; similarly, the surfaces of the four rivet gun heads 21 can also have light red, light yellow, light blue and light green labels, corresponding to the color labels of the pull-rivets 1 respectively. No matter the first label is the same as or corresponds to the second label, the pull-rivets 1 of four specifications correspond to the four rivet gun heads 21 matched therewith. After the user selects the required pull-rivets 1, it is easy to find out one rivet gun head 21 with the color the same as or corresponding to the color of the pull-rivet 1, thus proceeding to the next step of pull riveting operation.

Figure 5:
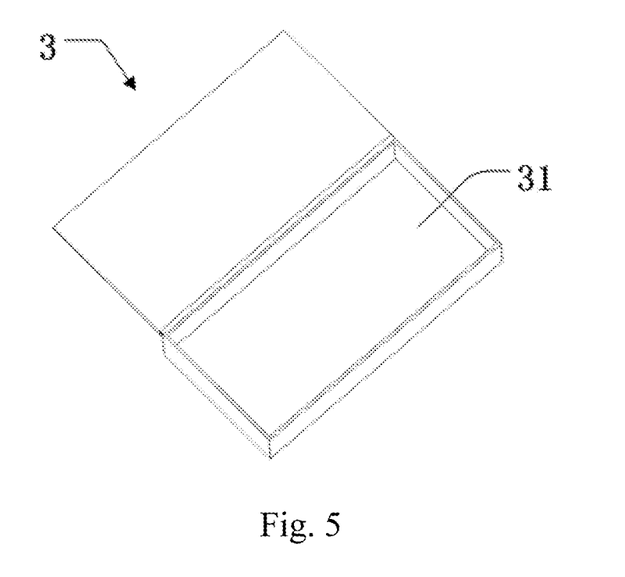
FIG. 5 is a structural schematic diagram of a receiving box according to the first, second, and fifth embodiments of the present invention.

Further, the present embodiment further includes a receiving box 3 for receiving pull-rivets 1. Usually, the existing pull-rivet receiving device is divided into a plurality of receiving spaces, each of which only can receive the pull-rivet of one specification. The plurality of pull-rivets is arranged neatly based on specifications for users' search. In the construction, once the pull-rivet is taken out by the user for a period of time and then needs to be put back, it tends to be misplaced since its specification is difficultly distinguished; therefore, it is necessary for the user to carefully take out and put back the pull-rivet, to prevent inconvenience for the subsequent work. In this way, after the pull riveting process is completed, it is relatively troublesome and time-consuming to tidy up the pull-rivets.

In the present embodiment, since the color label of the pull-rivet 1 is clear and is convenient to be identified, a large number of pull-rivets 1 may be placed in the receiving box 3 disorderly. The receiving box 3 can only include a large receiving space 31, thereby effectively simplifying the structure and processing of the pull-rivet receiving device, saving the raw materials of the receiving box, and lowering the production cost of the receiving box. After construction, all the rest pull-rivets may be directly put back into the receiving box 3, without being placed separately, which is simple, convenient and saves time.

The present invention has the advantageous effects that a new pull riveting system is provided, in which color labels easily identified with naked eyes are arranged on the rivet gun head and the pull-rivet, such that the pull-rivet and the rivet gun head which are matched with each other form a simple correspondence, so that the user may rapidly identify the pull-rivet specification and the rivet gun head matched with the pull-rivet, effectively reducing the waste of the pull-rivets, lowering the damage risk to the rivet gun, and effectively improving the work efficiency.

Second Embodiment

Most of the technical features of the present embodiment are the same as those in the first embodiment, with the distinguishable technical feature that the first label and the second label are not color labels but are shape labels.

In the present embodiment, the first label is a shape label, the categories of two or more groups of pull-rivets are distinguished using two or more shapes, each shape corresponds to one pull-rivet category, and the pull-rivets 1 of different specifications are represented by different shapes. The user may know the specification of this pull-rivet when catching sight of the pull-rivets 1. Specifically, the first label has the shape of the first pattern arranged on the surface of the pull-rivet. The first pattern may be directly printed on the surface of the pull-rivet by silk screen, transfer printing, paint spraying, or the like, and may be printed on a sticker attached on the surface of the pull-rivet. For example, there are four small pull-rivets commercially available, with the diameters of their rivet mandrels of 1.55 mm, 1.75 mm, 2.1 mm and 2.6 mm respectively. Circular, square, triangular and regularly hexagonal first patterns are arranged on the surfaces of the four pull-rivets using the above-mentioned method. The four shapes correspond to the pull-rivets of four specifications respectively. The user will know that the rivet mandrel of the pull-rivet has a diameter of 1.55 mm when catching sight of the circular pattern outside a certain pull-rivet, and will know that the rivet mandrel of the pull-rivet has a diameter of 2.6 mm when catching sight of the regularly hexagonal pattern outside a certain pull-rivet, and so on. The user may rapidly select the appropriate pull-rivet according to the size of the inner diameter of the riveting hole of the object to be riveted, based on specific requirements in the riveting construction.

In the present embodiment, the second label is a shape label, the categories of two or more groups of pull-rivets are distinguished using two or more shapes, and each shape corresponds to one pull-rivet category matching with one rivet gun head. The shape label of the rivet gun head 21 represents the pull-rivet specification suitable for the rivet gun head 21.

The second label has a shape of a base 22. Specifically, the second label has the shape of a cross section of the base. In another variation of the present invention, the second label may have a shape of a bump or a groove arranged on the surface of one rivet gun head, specifically, the shape of the cross section of the bump or the groove. The user will know the pull-rivet specification suitable for the rivet gun head 21 when catching sight of the rivet gun head 21. For example, usually, a singlehanded rivet gun is provided with four detachable rivet gun heads 21 matching with the pull-rivets 1 of four specifications respectively. The user may exchange the rivet gun head 21 by him or herself as appropriate. In the present embodiment, the base 22 or the bump or the groove of the four rivet gun heads 21 may have the cross sections of the four shapes, representing the pull-rivets 1 of four specifications matching with the rivet gun heads 21 respectively.

When one pull-rivet 1 is matched with one rivet gun head 21, the shape of the first label of the pull-rivet 1 is the same as or corresponds to that of the second label of the rivet gun head 21. Specifically, the four rivet gun heads 21 are matched with the pull-rivets 1 of four specifications. The cross section of the base 22 or the bump or the groove of the four rivet gun heads 21 are respectively designed into round, square, triangular, and regularly hexagonal shapes, the same as or corresponding to the shape labels of the pattern of the pull-rivets 1 respectively. The pattern shape of the pull-rivet 1 and the base shape of the rivet gun head 21 corresponding to each other have the same or corresponding shape, but the sizes thereof may be different.

In another variation of the present invention, the second label has the shape of the second pattern arranged on the surface of the rivet gun head 21. The second pattern may be directly printed on the surface of the rivet gun head 21 by silk screen, transfer printing, paint spraying, or the like, and may be printed on a sticker attached on the surface of the rivet gun head 21. The patterns of the four rivet gun heads 21 are designed into four shapes, respectively representing the pull-rivets 1 of four specifications matched with the rivet gun head 21. When one pull-rivet 1 is matched with one rivet gun head 21, the shape of the pattern of the pull-rivet 1 is the same as or corresponds to that of the pattern of the rivet gun head 21.

No matter whether the first label is the same as or corresponds to the second label, the pull-rivets 1 of four specifications correspond to the four rivet gun heads 21 matched therewith. Having selected the required pull-rivets 1, the user can identify, with naked eyes, the category and specification of each pull-rivet from a large number of pull-rivets. It is easy to find out one rivet gun head 21 with the shape same as or corresponding to this pull-rivet 1, thereby proceeding to the next step of pull riveting operation. Other technical features of the present embodiment are the same as those in the first embodiment, and are not repeated herein.

The present invention has the advantageous effects that a new pull riveting system is provided, in which shape labels easily identified with naked eyes are arranged on the rivet gun head and the pull-rivet, such that the pull-rivet and the rivet gun head matched with the pull-rivet correspond to each other, so that the user may rapidly identify the pull-rivet specification and the rivet gun head matched with the pull-rivet, effectively reducing the waste of the pull-rivets, lowering the damage risk to the rivet gun, and effectively improving the work efficiency.

Third Embodiment

Figure 6:
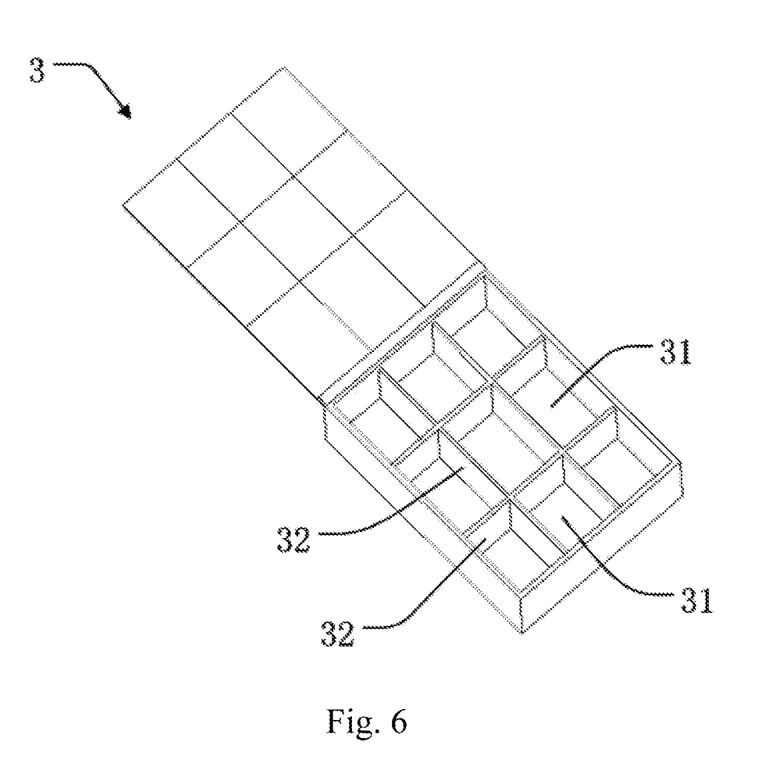
FIG. 6 is a structural schematic diagram of a receiving box according to the third, fourth, and sixth embodiments of the present invention.

Most of the technical features of the present embodiment are the same as those in the first embodiment with the distinguishable technical feature that in the third embodiment, the receiving box 3 does not only include one receiving space, but includes two or more receiving spaces 31, each of which is used for receiving the pull-rivets 1. When one pull-rivet 1 is matched with one rivet gun head 21, the third label of the receiving space 31 where the pull-rivet 1 is located is used for identifying the category of the pull-rivet 1 in the receiving space, and is the same as or corresponds to the second label of the rivet gun head 21.

The pull-rivets 1 are divided into two groups according to the diameter length of their rivet mandrels 11. Two or more pull-rivets 1 in the same group are put in the same receiving space 31. No matter whether or not the pull-rivet 1 is provided with an identifiable label, the user can identify the specification or category of the pull-rivet 1 placed in a certain receiving space according to the third label.

The third label is a color label, and two or more groups of pull-rivet categories are distinguished by two or more colors. Each color represents the category or specification of the pull-rivet located in one receiving space. In the present embodiment, the third label is the color of the space wall which includes the side wall or bottom surface or top surface of the receiving space. The user may know the category or specification of the pull-rivet in the receiving space 31 at a glance of the color of the space wall 32 of any one receiving space 31 in the receiving box 3.

The space wall 32 is partially or entirely made of a colorful material. The color of the space wall material of each receiving space is the third label. The space wall 32 may be made of a nontransparent material of the same color. The outer side of the space wall 32 is partially or entirely attached with the colorful label or coated with a colorful dye. The color of the color label or the colorful dye of each receiving space is the third label. The space wall 32 may be partially or entirely made of the transparent material. The inner side of the space wall 32 is partially or entirely attached with the colorful label or coated with the colorful dye. The color of the colorful label or the colorful dye of each receiving space is the third label.

When one pull-rivet is matched with one rivet gun head, the color of the third label of the receiving space 31 is the same as or corresponds to the color of the second label of the rivet gun head 21. The color of the above-mentioned space wall material, the colorful label or the colorful dye is designed into red, yellow, blue and green, corresponding to the colors of the pull-rivets 1 of four specifications respectively, and/or corresponding to the colors of the four rivet gun heads 21. The plurality of receiving spaces 31 correspond to the pull-rivets 1 of four specifications and the four rivet gun heads 21. Having learnt the specification of the required pull-rivets 1, the user easily finds out the receiving space 31 with a color the same as or corresponding to the color of the pull-rivet 1, and takes out the corresponding pull-rivet 1. Then, the user finds out one rivet gun head 21 with a color the same as or corresponding to the color of the receiving space 31, and thus proceeds to the next step of pull riveting operation.

In another variation of the present embodiment, the first label of the pull-rivet is removed, and the receiving space 31 directly corresponds to the rivet gun head 21. Having learnt the specification of the required pull-rivets 1, the user directly finds out the receiving space 31 corresponding to the specification of the pull-rivet 1, and takes out the pull-rivet 1 therein. Then, the user finds out one rivet gun head 21 with a color the same as or corresponding to the color of the receiving space 31, and thus proceeds to the next step of pull riveting operation.

Other technical features of the present embodiment are the same as those in the first embodiment, and are not repeated herein.

The present invention has the advantageous effects that a new pull riveting system is provided, in which color labels easily identified with naked eyes are arranged on the rivet gun head, the pull-rivet and/or the receiving box, such that the pull-rivet and the rivet gun head matched with the pull-rivet correspond to each other, the pull-rivet and the receiving box where the pull-rivet is placed correspond to each other, so that the user may rapidly identify the pull-rivet specification and the rivet gun head matched with the pull-rivet, effectively reducing the waste of the pull-rivets, lowering the damage risk to the rivet gun, and effectively improving the work efficiency.

Fourth Embodiment

Most of the technical features of the present embodiment are the same as those in the second embodiment with the distinguishable technical feature that in the fourth embodiment, the receiving box 3 does not only include one receiving space, but includes two or more receiving spaces 31, each of which is used for receiving the pull-rivets 1. When one pull-rivet 1 is matched with one rivet gun head 21, the third label of the receiving space 31 where the pull-rivet 1 is located is used for identifying the category of the pull-rivet 1 in the receiving space, and is the same as or corresponds to the second label of the rivet gun head 21.

The pull-rivets 1 are divided into two groups according to the diameter length of their rivet mandrels 11. Two or more pull-rivets 1 in the same group are put in the same receiving space 31. No matter whether or not the pull-rivet 1 is provided with an identifiable label, the user can identify the specification or category of the pull-rivet 1 placed in a certain receiving space according to the third label.

The third label is a shape label, and two or more groups of pull-rivet categories are distinguished by two or more shapes. Each shape represents the category or specification of the pull-rivet located in one receiving space. In the present embodiment, the third label is the shape of the third pattern arranged on the surface of the inner side or the outer side of the space wall; the space wall includes the side wall or the bottom surface or the top surface of the receiving space. The user may know the category or specification of the pull-rivet in the receiving space 31 at a glance of the shape of the third pattern of any one receiving space 31 in the receiving box 3.

When one pull-rivet is matched with one rivet gun head, the shape of the third label of the receiving space 31 is the same as or corresponds to the shape of the second label of the rivet gun head 21. The shapes of the third patterns of the receiving spaces 31 are designed into circular, square, triangular, and regularly hexagonal shapes, corresponding to the shapes of the pull-rivets 1 of four specifications respectively, and/or corresponding to the shapes of the four rivet gun heads 21. The plurality of receiving spaces 31 correspond to the pull-rivets 1 of four specifications and the four rivet gun heads 21. Having learnt the specification of the required pull-rivets 1, the user easily finds out the receiving space 31 with a shape the same as or corresponding to the shape of the pull-rivet 1, and takes out the corresponding pull-rivet 1. Then, the user finds out one rivet gun head 21 with a shape the same as or corresponding to the shape of the third pattern of the receiving space 31, and thus proceeds to the next step of pull riveting operation.

In another variation of the present embodiment, the first label of the pull-rivet is removed, and the receiving space 31 directly corresponds to the rivet gun head 21. Having learnt the specification of the required pull-rivets 1, the user directly finds out the receiving space 31 corresponding to the specification of the pull-rivet 1, and takes out the pull-rivet 1 therein. Then, the user finds out one rivet gun head 21 with a shape the same as or corresponding to the shape of the third pattern of the receiving space 31, and thus proceeds to the next step of pull riveting operation. Other technical features of the present embodiment are the same as those in the first embodiment, and are not repeated herein.

The present invention has the advantageous effects that a new pull riveting system is provided, in which shape labels easily identified with naked eyes are arranged on the rivet gun head, the pull-rivet and/or the receiving box, such that the pull-rivet and the rivet gun head which are matched with each other form a correspondence, and the pull-rivet corresponds to the receiving box where the pull-rivet is placed, so that the user may rapidly identify the pull-rivet specification and the rivet gun head matched with the pull-rivet, effectively reducing the waste of the pull-rivets, lowering the damage risk to the rivet gun, and effectively improving the work efficiency.

Fifth Embodiment

Most of the technical features of the present embodiment are the same as those in the first embodiment with the distinguishable technical feature that in the fifth embodiment, the first label and the second label are not color labels, but character labels. The character label includes a number label or a letter label.

The first label and the second label may be 1, 2, 3, 4, or A, B, C and D simultaneously. The first label can be written on a sticker, attached on the surface of the pull-rivet 1. The second label can be written on a sticker, attached on the surface of the rivet gun head 21. Or, the first label is inscribed on the surface of the pull-rivet 1 in the form of intaglio or relief, and the second label is inscribed on the surface of the rivet gun head 21 in the form of intaglio or relief. The character label may be a Chinese character label, but can be only suitable for some pull-rivets with relatively large surface areas. For the pull-rivets with over small surface areas, the Chinese character is difficultly recognized, so the number label or the letter label is more suitable.

The pull-rivets 1 of four specifications correspond to the four rivet gun heads 21 matched therewith. Having selected the required pull-rivets 1, the user can find out one rivet gun head 21 matched with this pull-rivet 1, thereby proceeding to the next step of pull riveting operation. Other technical features of the present embodiment are the same as those in the first embodiment, and are not repeated herein.

The present invention has the advantageous effects that a new pull riveting system is provided, in which character labels easily identified with naked eyes are arranged on the rivet gun head and the pull-rivet, such that the pull-rivet and the rivet gun head matched with the pull-rivet correspond to each other, so that the user may rapidly identify the pull-rivet specification and the rivet gun head matched with the pull-rivet, effectively reducing the waste of the pull-rivets, lowering the damage risk to the rivet gun, and effectively improving the work efficiency.

Sixth Embodiment

Most of the technical features of the present embodiment are the same as those in the third embodiment with the distinguishable technical feature that in the sixth embodiment, the first label and/or the third label, the second label are not color labels, but character labels. The character label includes a number label or a letter label.

The first label, the second label and the third label may be 1, 2, 3, 4, or A, B, C and D simultaneously. The first label can be written on a sticker, attached on the surface of the pull-rivet 1. The second label can be written on a sticker, attached on the surface of the rivet gun head 21. The first label can be written on a sticker, attached to the surface of the space wall 31 of the receiving space 3. Or, the first label is inscribed on the surface of the pull-rivet 1 in the form of intaglio or relief, the second label is inscribed on the surface of the rivet gun head 21 in the form of intaglio or relief, and the third label is inscribed on the surface of the space wall 31 of the receiving space 3 in the form of intaglio or relief. The character label may also be a Chinese character label, but can be only suitable for some pull-rivets with relatively large surface areas. For the pull-rivets with over small surface areas, the Chinese character is difficultly recognized, so the number label or the letter label is more suitable.

The pull-rivets 1 of four specifications and four receiving spaces 31 correspond to the four rivet gun heads 21 matched therewith. Having learnt the specification of the required pull-rivets 1, the user can easily find out the receiving space 31 the same as or corresponding to the characters of the pull-rivet 1, and takes out the corresponding pull-rivets 1. Having selected the required pull-rivets 1, the user easily finds out one rivet gun head 21 matched with this pull-rivet 1, thereby proceeding to the next step of pull riveting operation.

In another variation of the present embodiment, the first label of the pull-rivet is removed, and the receiving space 31 directly corresponds to the rivet gun head 21. Having learnt the specification of the required pull-rivets 1, the user directly finds out the receiving space 31 with a specification corresponding to that of the pull-rivet 1, and takes out the pull-rivet 1 therein. Then, the user finds out one rivet gun head 21 the same as or corresponding to the character of the receiving space 31, and thus proceeds to the next step of pull riveting operation. Other technical features of the present embodiment are the same as those in the third embodiment, and are not repeated herein.

The present invention has the advantageous effects that a new pull riveting system is provided, in which character labels easily identified with naked eyes are arranged on the rivet gun head, the pull-rivet and/or the receiving box, such that the pull-rivet and the rivet gun head which are matched with each other form a correspondence, so that the user may rapidly identify the pull-rivet specification and the rivet gun head matched with the pull-rivet, effectively reducing the waste of the pull-rivets, lowering the damage risk to the rivet gun, and effectively improving the work efficiency.

The above describes the preferable specific embodiments of the present invention in detail. It shall be understood that persons skilled in the art can variously modify and change the present invention according to the concepts of the present invention without creative work. Therefore, what shall be within the protection scope determined by the claims are all the technical solutions which can be obtained through logic analysis, reasoning or limited experiments on the basis of the prior art according to the concepts of the present invention by persons skilled in the art.

The invention claimed is:

1. A pull riveting system, comprising:
two or more pull-rivets, comprising a rivet mandrel; and
a riveting device, comprising two or more rivet gun heads, each of which is provided with a rivet gun hole;
wherein
each of the pull-rivets is provided with a first label;
each rivet gun head is provided with a second label;
when one pull-rivet is matched with one rivet gun head, the rivet mandrel of the pull-rivet is applicable to the rivet gun hole of the rivet gun head,
the first label of the pull-rivet is the same as or corresponds to the second label of the rivet gun head.

2. The pull riveting system according to claim 1, wherein
the pull-rivet is divided into at least two groups according to the size specification of its rivet mandrel;
the diameters of the rivet mandrels of two or more pull-rivets in the same group have the same size specifications;
two or more pull-rivets in the same group have the same first label;
two or more pull-rivets in the same group are matched with the same rivet gun head.

3. The pull riveting system according to claim 2, wherein
the first label of the pull-rivet is used for identifying a category of the pull-rivet;
the second label of the rivet gun head is used for identifying the category of the pull-rivet matching with this rivet gun head.

4. The pull riveting system according to claim 3, wherein
the first label is a color label, the categories of two or more groups of pull-rivets are distinguished using two or more colors, each color corresponds to one pull-rivet category;
the second label is a color label, the categories of two or more groups of pull-rivets are distinguished using two or more colors, each color corresponds to one pull-rivet category matching with one rivet gun head;
when one pull-rivet is matched with one rivet gun head, the color of the first label of the pull-rivet is the same as or corresponds to that of the second label of the rivet gun head.

5. The pull riveting system according to claim 4, wherein
the first label has the color of a pull-rivet coating which is partially or entirely coated on the surface of the pull-rivet;
the second label has the color of a rivet gun head coating which is partially or entirely coated on the surface of the rivet gun head.

6. The pull riveting system according to claim 3, wherein
the first label is a shape label, the categories of two or more groups of pull-rivets are distinguished using two or more shapes, each shape corresponds to one pull-rivet category;
the second label is a shape label, the categories of two or more groups of pull-rivets are distinguished using two or more shapes, each shape corresponds to one pull-rivet category matching with one rivet gun head;
when one pull-rivet is matched with one rivet gun head, the shape of the first label of the pull-rivet is the same as or corresponds to that of the second label of the rivet gun head.

7. The pull riveting system according to claim 6, wherein
the first label has a shape of a first pattern, the first pattern is arranged on the surface of the pull-rivet;
the second label has a shape of a base, the base is a part of the rivet gun head; or,
the second label has a shape of a bump or a groove, the bump or the groove is arranged on the surface of one rivet gun head; or,
the second label has a shape of a second pattern, the second pattern is arranged on the surface of the rivet gun head; when one pull-rivet is matched with one rivet gun head, the base or the bump or the groove has a shape the same as or corresponding to the shape of the pattern.

8. The pull riveting system according to claim 3, wherein
the first label and the second label are both character labels;
the character label comprises a number label or a letter label.

9. The pull riveting system according claim 1, further comprising
a receiving box for receiving the pull-rivet.

10. A pull riveting system, comprising:
two or more pull-rivets, comprising a rivet mandrel;
a riveting device, comprising two or more rivet gun heads provided with rivet gun holes; and
a receiving box, comprising two or more receiving spaces, each of which is used for receiving the pull-rivet;
wherein
each rivet gun head is provided with a second label;
each pull-rivet is provided with a first label, and/or, each receiving space is provided with a third label;
when one pull-rivet is matched with one rivet gun head, the rivet mandrel of the pull-rivet is applicable to the rivet gun hole of the rivet gun head;
the first label of the pull-rivet, and/or, the third label of the receiving space where the pull-rivet is located is the same as or corresponds to the second label of the rivet gun head.

11. The pull riveting system according to claim 10, wherein
the pull-rivet is divided into at least two groups according to the size specification of the diameter of its rivet mandrel;
the diameters of the rivet mandrels of two or more pull-rivets in the same group have the same size specifications;
two or more pull-rivets in the same group have the same first label;
two or more pull-rivets in the same group are matched with the same rivet gun head;
two or more pull-rivets in the same group are arranged in the same receiving space.

12. The pull riveting system according to claim 11, wherein
the first label of the pull-rivet is used for identifying a category of the pull-rivet;
the second label of the rivet gun head is used for identifying the category of the pull-rivet matching with this rivet gun head;
the third label of the receiving space is used for identifying the category of the pull-rivet in the receiving space.

13. The pull riveting system according to claim 12, wherein
the second label is a color label, the categories of two or more groups of pull-rivets are distinguished using two or more colors, each color represents one pull-rivet category matching with one rivet gun head;
the first label is a color label, the categories of two or more groups of pull-rivets are distinguished using two or more colors, each color represents one pull-rivet category; and/or,
the third label is a color label, the categories of two or more groups of pull-rivets are distinguished using two or more colors, each color represents the category of the pull-rivet in one receiving space;
when one pull-rivet is matched with one rivet gun head, the color of the first label of the pull-rivet and/or the color of the third label of the receiving space is the same as or corresponds to that of the second label of the rivet gun head.

14. The pull riveting system according to claim 13, wherein
the second label has the color of a rivet gun head coating which is partially or entirely coated on the surface of the rivet gun head;
the first label has the color of a pull-rivet coating which is partially or entirely coated on the surface of the pull-rivet; and/or,
the third label has the color of a space wall which comprises a side wall or a bottom surface or a top surface of the receiving space.

15. The pull riveting system according to claim 14, wherein
the space wall is made of a colorful material; or,
an inner side or an outer side of the space wall is partially or entirely attached with a colorful tag; or,
the inner side or the outer side of the space wall is partially or entirely coated with a colorful dye.

16. The pull riveting system according to claim 12, wherein
the second label is a shape label, the categories of two or more groups of pull-rivets are distinguished using two or more shapes, each shape corresponds to one pull-rivet category matching with one rivet gun head;
the first label is a shape label, the categories of two or more groups of pull-rivets are distinguished using two or more shapes, each shape corresponds to one pull-rivet category; and/or,
the third label is a shape label, the categories of two or more groups of pull-rivets are distinguished using two or more shapes, each shape corresponds to the category of the pull-rivet located in one receiving space;
when one pull-rivet is matched with one rivet gun head, the shape of the first label of the pull-rivet and/or the shape of the third label of the receiving space is the same as or corresponds to that of the second label of the rivet gun head.

17. The pull riveting system according to claim 16, wherein
the second label has a shape of a base, the base is a part of the rivet gun head; or,
the second label has a shape of a bump or a groove, the bump or the groove is arranged on the surface of one rivet gun head;
the first label has a shape of the first pattern, the first pattern is arranged on the surface of the pull-rivet; and/or,
the third label has a shape of a third pattern, the third pattern is arranged on the surface of the inner side or the outer side of the space wall;
when one pull-rivet is matched with one rivet gun head, the base or the bump or the groove has a shape the same as or corresponding to the shape of the first or second pattern.

18. The pull riveting system according to claim 12, wherein
the second label, the first label and/or the third label are all character labels or pattern labels;
the character label comprises a number label or a letter label.

* * * * *